(12) United States Patent
Regier et al.

(10) Patent No.: US 11,606,909 B2
(45) Date of Patent: Mar. 21, 2023

(54) TWINE TENSION ASSEMBLY

(71) Applicant: AGCO Corporation, Duluth, GA (US)

(72) Inventors: Bernard Dean Regier, Hesston, KS (US); Dino Ray Valdez, Hesston, KS (US); Nathan K. Ensminger, South Hutchinson, KS (US)

(*) Notice: Subject to any disclaimer, the term of this patent is extended or adjusted under 35 U.S.C. 154(b) by 34 days.

(21) Appl. No.: 17/365,176

(22) Filed: Jul. 1, 2021

(65) Prior Publication Data
US 2022/0000035 A1 Jan. 6, 2022

Related U.S. Application Data

(60) Provisional application No. 63/046,807, filed on Jul. 1, 2020.

(51) Int. Cl.
| | | |
|---|---|---|
| *A01F 15/08* | (2006.01) | |
| *A01F 15/14* | (2006.01) | |
| *B65H 63/04* | (2006.01) | |
| *B65H 69/04* | (2006.01) | |

(52) U.S. Cl.
CPC ........ *A01F 15/0858* (2013.01); *A01F 15/145* (2013.01); *A01F 15/148* (2013.01); *B65H 63/04* (2013.01); *B65H 69/04* (2013.01)

(58) Field of Classification Search
CPC ......... B65B 13/16; B65B 13/22; B65B 13/26; B65B 13/32; A01F 15/14; A01F 15/145; A01F 15/0858; A01D 59/00; A01D 59/04; B65H 63/04; B65H 69/04
See application file for complete search history.

(56) References Cited

U.S. PATENT DOCUMENTS

| | | | |
|---|---|---|---|
| 3,892,432 A | | 7/1975 | Ingus |
| 4,054,160 A | * | 10/1977 | Knudsen ................. B65B 13/16 100/10 |
| 4,196,661 A | | 4/1980 | Peterson et al. |
| 8,671,834 B1 | | 3/2014 | Rotole et al. |
| 2015/0053808 A1 | | 2/2015 | Tanigawa et al. |

FOREIGN PATENT DOCUMENTS

| | | | |
|---|---|---|---|
| DE | 3640696 A1 | 6/1988 | |
| DE | 40 16 964 A1 | 11/1991 | |
| EP | 2 737 789 A2 | 6/2014 | |
| EP | 3111747 A1 * | 1/2017 | ......... A01F 15/0715 |
| GB | 703170 A | 1/1954 | |

OTHER PUBLICATIONS

UK Intellectual Property Office, Search Report for related UK Application No. 2010547.4, dated Jan. 11, 2021.
European Patent Office, Search Report for related European Patent Application No. EP EP 21 16 5005.6, dated Sep. 15, 2021.

* cited by examiner

*Primary Examiner* — Jimmy T Nguyen

(57) ABSTRACT

A twine tension relief assembly for a baler including a tension detection apparatus for detecting the tension in a line of twine, a biased cutting element displaceable between a first retained position and a second released position and an actuator adapted to cause the biased cutting element to move from the first retained position to the second released position in response to a signal issued by the tension detection apparatus. The practical application includes when the tension in a strand of twine exceeds a predetermined threshold, the tension detection apparatus causes movement of the biased cutting element so that a strand of twine passing though the twine tension relief assembly is severed and damage to the knotter mechanism and its component parts is avoided.

19 Claims, 6 Drawing Sheets

TWINE TENSION ASSEMBLY

CROSS-REFERENCE TO RELATED APPLICATIONS

This application claims the benefit of the filing date of U.S. Provisional Patent Application 63/046,807, filed Jul. 1, 2020, the entire disclosure of each of which is incorporated herein by reference.

FIELD OF THE INVENTION

The present invention relates to a mechanism for use in tying loops of twine about rectangular bales, and in particular to a mechanism for preventing an excess of tension in the twine being fed to a knotter mechanism. The present invention also relates a baler incorporating such a mechanism.

BACKGROUND

Rectangular bales are able to maintain their shape by means of a series of parallel extending twine loops, provided lengthwise around the bales. Current large square balers are equipped with a plurality of pivotally mounted, upwardly biased twine tensioner arms each associated with a plurality of knotter assemblies to maintain proper tension on the twine to ensure each knotter assembly performs properly. The twine is drawn from suitable twine boxes. If the twine tensioner arm fails to maintain proper tension on the twine, the twine can be pulled out of the knotter assembly and a mistie occurs. A number of factors affect the tension on the twine. Sometimes twine gets tangled in the twine box which makes it difficult or impossible for the baler to make knots. In extreme situations the tension in the twine is sufficient to cause bending of the baler needles and also to interfere with the other baler components which may become damaged as a result. Once the baler needles become bent, functioning of the knotter mechanism is significantly impaired causing operational downtime of the baler until repairs may be effected.

It is further a problem that an operator of the baler will not know there is a problem until the knot has been missed or damage to baler components has occurred.

It is an advantage of the present invention that it seeks to address these problems.

BRIEF SUMMARY

According to a first aspect of the present invention, a twine tension relief assembly for a baler comprises a tension detection apparatus for detecting the tension in a line of twine, a biased cutting element displaceable between a first retained position and a second released position and an actuator adapted to cause the biased cutting element to move from the first retained position to the second released position in response to a signal issued by the tension detection apparatus.

This has as an advantage that should a tension in a strand of twine exceed a predetermined threshold, the tension detection apparatus generates the signal to cause the movement of the biased cutting element so that a strand of twine passing though the twine tension relief assembly is severed and damage to the knotter mechanism and its component parts is avoided.

Preferably, the twine tension relief assembly further comprises a housing having a channel in which the biased cutting element is located.

Preferably, the twine tension relief assembly further comprises a displaceable release mechanism actuated by the actuator to release the biased cutting element from the first retained position and allow the biased cutting element to move to the second released position.

Preferably the biased cutting element comprises a displaceable knife element and a compression spring.

More preferably, the displaceable release mechanism comprises a rotational body rotatable about an axis between a first position or set of positions in which the biased cutting element is maintained in the first retained position and a second position in which the biased cutting element is free to advance to the second released position.

More preferably the knife element comprises a keyhole aperture comprising a circular opening and an elongate channel extending along a longitudinal axis of the knife element.

Even more preferably, the rotational body extends through the keyhole aperture, and comprises a linear portion in the region of the keyhole aperture, the linear portion adopting a first configuration displaced from the elongate channel when the biased cutting element is in the first retained position and a second configuration aligned with the elongate channel when the biased cutting element is in the second released position.

Yet more preferably, the rotational body comprises a lever operated by the actuator to cause the rotational body to rotate the linear portion from the first configuration to the second configuration.

According to a second aspect of the invention, in a combination comprising an agricultural vehicle and a baler towed by the agricultural vehicle, the baler comprising a plurality of knotter assemblies, each knotter assembly is provided with an associated twine tension relief assembly according to the first aspect of the invention Preferably, the combination further comprises a control unit and a memory in communication with the control unit, the control unit being configured to receive the signals issued by each tension detection apparatus and to compare the signals against a predetermined set of values stored in the memory to determine whether an error condition exists and in the event of an error condition the control unit being configured to generate a signal to operate the actuator associated with the tension detection apparatus generating the signal corresponding to the error condition.

Preferably, the control unit comprises a processor located on the baler. Alternatively the control unit comprises a processor on the baler in communication with a processor on the agricultural vehicle. Alternatively, the control unit comprises a processor located on the agricultural vehicle.

Preferably the agricultural vehicle comprises a user terminal in communication with the control unit. More preferably, in the event of an error condition the control unit being configured to generate a signal to cause the user terminal to signal which tension detection apparatus generated the signal corresponding to the error condition. This has as an advantage that the operator can determine which twine path requires remedial attention.

Preferably, in the event of an error condition the control unit is adapted to generate a signal to cause the baler to cease operating.

According to a third aspect of the invention, a computer implemented method comprises the steps of a control unit receiving a plurality of signals, the signals representing a tension in one or more strands of twine, the control unit comparing the signals representative of the tension in the one or more strands of twine with at least one reference value corresponding to a threshold tension value to determine whether the signal or any of the signals representative of the tension in the one or more strands of twine exceed the threshold value, and in the event that the signal or any of the signals representative of the tension in the one or more strands of twine exceed the threshold value generating a signal to cause the one or more strands of twine exceeding the threshold value to be severed.

According to a fourth aspect of the present invention, a computer readable program comprises instructions that cause one or more processors to implement the method of the third aspect of the invention.

BRIEF DESCRIPTION OF THE DRAWINGS

The invention will now be described, by way of example only, with reference to the accompanying drawings, in which.

DETAILED DESCRIPTION OF SPECIFIC EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel.

Figure 1:
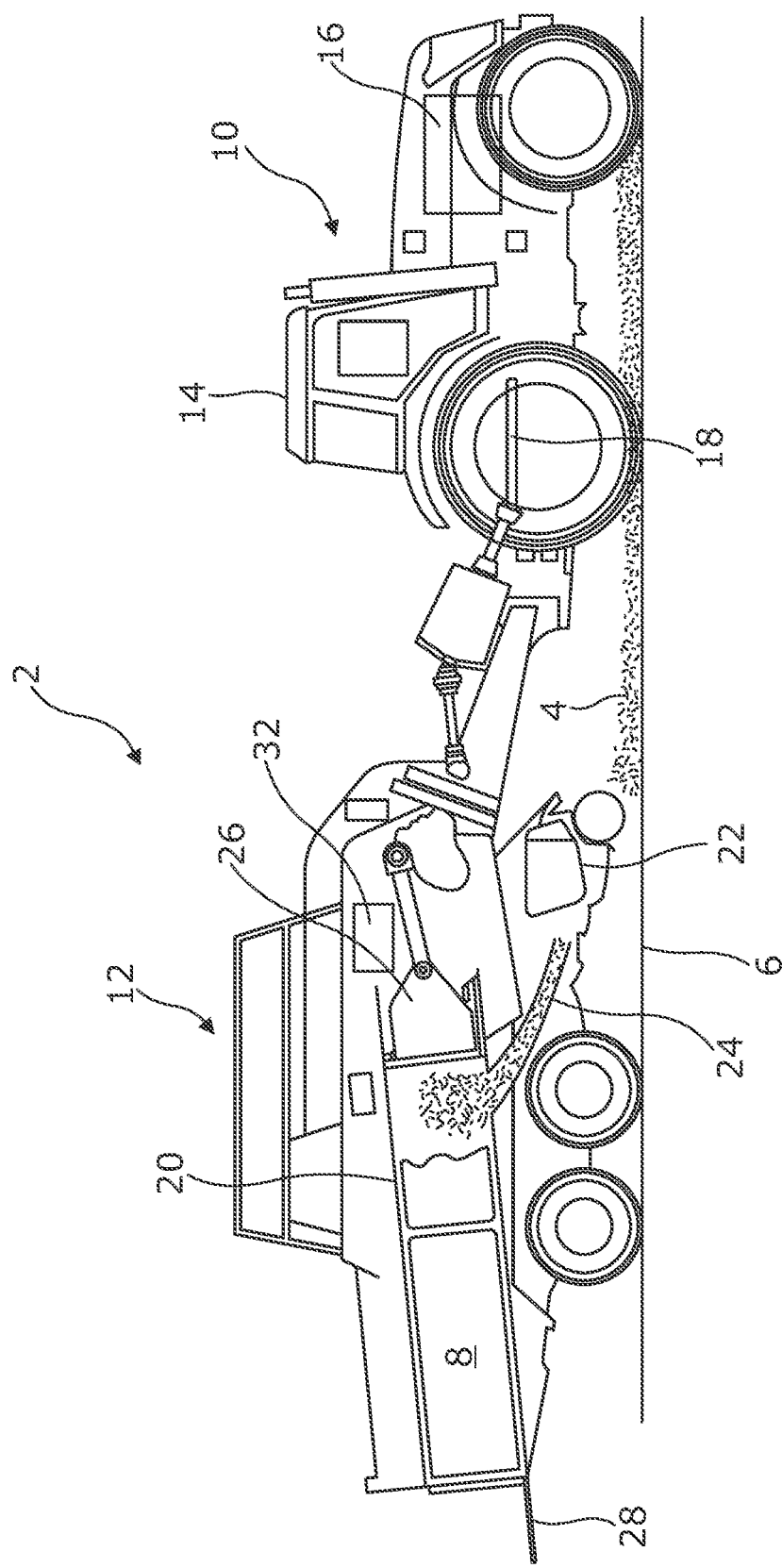
FIG. 1 shows a tractor and baler combination for use with the present invention.
Figure 2:
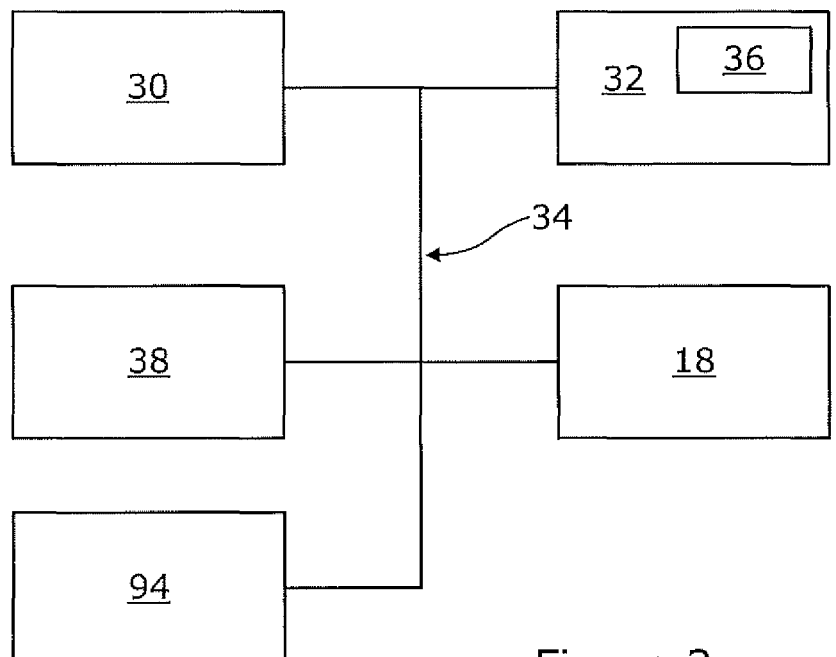
FIG. 2 shows a schematic diagram of certain baler elements for use with the present invention.

With reference to FIG. 1, a semi-schematic diagram of an agricultural baler system 2 is shown in which the invention may be employed while baling loose crop material 4 from the ground 6 into formed bales 8. The baler system includes a towing vehicle 10 and a baler 12. The towing vehicle 10 may include a cab 14 wherein an operator may be located, an engine 16 operable to move the towing vehicle, and a power take-off (PTO) 18 operable to transfer mechanical power from the engine 16 to the baler 12. The baler 12 is hitched to the towing vehicle in any suitable manner, and power for operating the various mechanisms of the baler 12 may be supplied by the PTO of the towing vehicle 10. One having ordinary skill in the art should appreciate in the context of the present disclosure that the example baler 12 is merely illustrative.

The baler 12 has a baling chamber 20 within which bales of crop material are formed. The baler is depicted as an "in-line" type of baler wherein the loose crop material 4 is picked up by a pickup assembly 22 and then loaded up into the baling chamber 20 by way of a stuffer chute assembly 24 including a charge forming stuffer chamber.

In the illustrated embodiment, the baler 12 is an "extrusion" type baler in which the bale discharge orifice at the rear of the baler 12 is generally smaller than upstream portions of the baling chamber 20 such that the orifice restricts the freedom of movement of a previous charge and provides back pressure against which a reciprocating plunger 26 can act within the baling chamber 20 to compress charges of crop materials to form the next bale. The dimensions of the discharge orifice and the squeeze pressure on the bales at the orifice are controlled by a compression mechanism as is understood by one skilled in the art.

The reciprocating plunger 26 presses newly introduced charges of crop material against a previously formed and tied bale to form a new bale. This action also causes both bales to intermittently advance toward a rear discharge orifice of the baler 12. The completed bales 8 are tied with binding material, for example twine. Once tied, the bales are discharged from the rear end of the bale-forming chamber onto a discharge platform in the form of a chute 28.

A user terminal 30 communicates with an electronic control unit 32. The electronic control unit 32 is also be in electronic or other communication with various components and devices of the baler (and/or the towing vehicle). Conveniently such communication may be enabled by way of a suitable data communication network 34 such as one compliant with the ISOBUS standard (a network in conformance to ISO 11783). For example, the electronic control unit may be in electronic communication with various actuators, sensors, and other devices within (or outside of) the baler. The electronic control unit 32 may communicate with various other components (including other controllers) in various known ways, including wirelessly.

Various alternative locations for the electronic control unit may be utilized, including locations on the towing vehicle. It will be understood that one or more electronic control units may be employed and that the electronic control unit(s) 32 may be mounted at various locations on the towing vehicle, baler, or elsewhere. The electronic control unit(s) may be a hardware, software, or hardware and software computing device, and may be configured to execute various computational and control functionality with respect to the baler (or towing vehicle).

The electronic control unit 32 is also able to access a suitable memory 36. The memory 36 may take any suitable form and is in electronic communication with the electronic control unit 32. The memory 36 is adapted to store, in any suitable manner such as a database or look up table, reference values for a desired parameter.

The baler 12 is provided with a plurality of knotter assemblies. In use, in order to provide a strand of binding material to each knotter assembly, a strand of binding material 40 is drawn from a supply roll provided in a twine box located to a side of the baler 12 through a plurality of twine guides provided in a frame of the baler 12 and through a final twine guide associated with a knotter assembly to a tensioner arm of the associated knotter assembly. As is known the baler comprises a plurality of knotter assemblies and some of the knotter assemblies are supplied with strands of binding material from supply rolls located to one side of the baler and the others are supplied with strands of binding material from supply rolls located to one side of the baler.

Each knotter assembly is configured to take strands of the binding material looped around a formed bale and bind the strands with two knots. During the bale knotting cycle of the baler, needles of each knotter mechanism abruptly pull lengths of the binding material from at least certain of the supply rolls in order to feed the binding material to the knotter mechanism. In extreme situations, the binding material gets tangled in the twine box and the resulting tension in the strand of binding material is sufficient to cause bending of the needles and also to interfere with the other baler components which may become damaged as a result.

By introducing a twine tension relief assembly (FIGS. 3 to 8) in the path of each of the strands of binding material, this problem can be addressed.

Referring to FIGS. 3 to 6, an example twine tension relief assembly 42 in accordance with the present invention is shown in which the strand 40 of binding material or twine is running freely. It will be understood that similar twine tension relief assemblies corresponding to the example twine tension relief assembly can be provided for each strand of twine. A suitable tension detection apparatus 38 for detecting the tension in the strand of twine 40 is provided. The tension detection apparatus 38 is in electronic communication with the electronic control unit 32. Again, it will be understood that any similar twine tension relief assemblies will each be provided with a suitable tension detection apparatus.

The example twine tension relief assembly 42 further comprises a biased cutting element and an actuator mechanism adapted to release the biased cutting element in response to a signal issued by the tension detection apparatus 38. In practice, the electronic control unit 32 is configured to receive signals issued by the tension detection apparatus 38 and to compare the signals against a predetermined set of values stored in the memory 36 to determine whether an error condition exists and in the event of an error condition the electronic control unit 32 is configured to generate an instruction signal to operate the actuator mechanism to release the biased cutting element.

This has as an advantage that should a tension in a strand of twine exceed a predetermined threshold, the biased cutting element may be released so that the strand of twine is severed and damage to the knotter mechanism and its component parts is avoided.

The biased cutting element is located within a channel in a housing. In the illustrated embodiment the housing comprises three principal elements; upper and lower central housing elements 46, 48 and first and second side housing elements 50,52.

Each of the first and second side housing elements 50,52 are generally planar and include matching elongate windows 54. Each of the first and second side housing elements 50,52 is also provided with an opening through which the strand 40 of twine may pass. In the illustrated embodiment, the twine relief assembly is further provided with a tubular guard member: a first part 56 extending away from the opening in the first side housing element 50 and a second part 58 extending away from the opening in the second side housing element 52.

Figure 4:
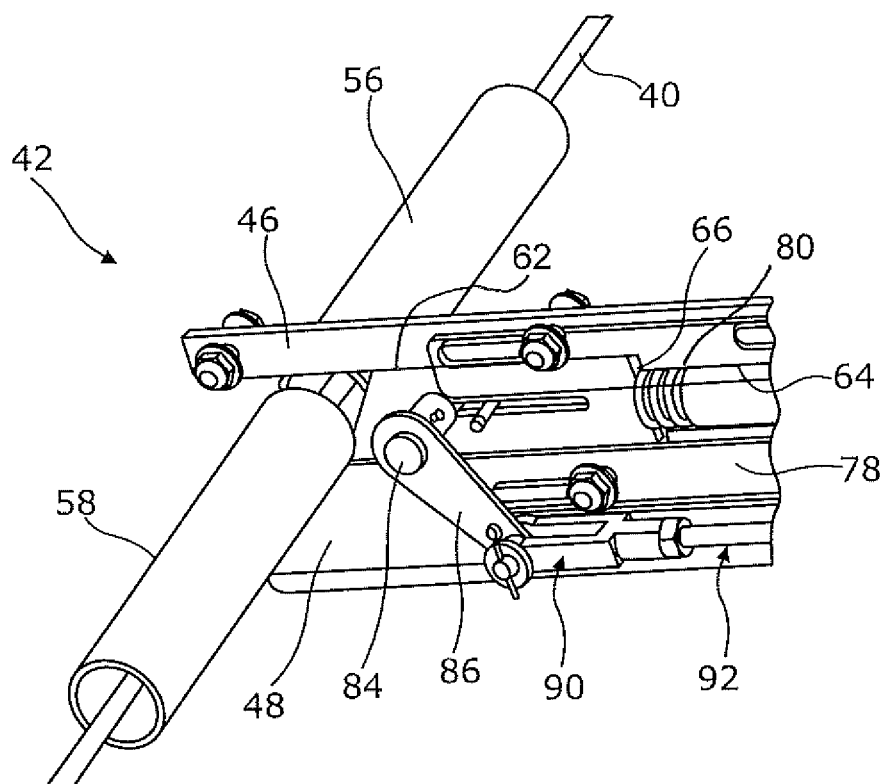
FIG. 4 shows the twine tension relief assembly of FIG. 3 in which certain elements of the assembly have been removed for clarity.
Figure 5:
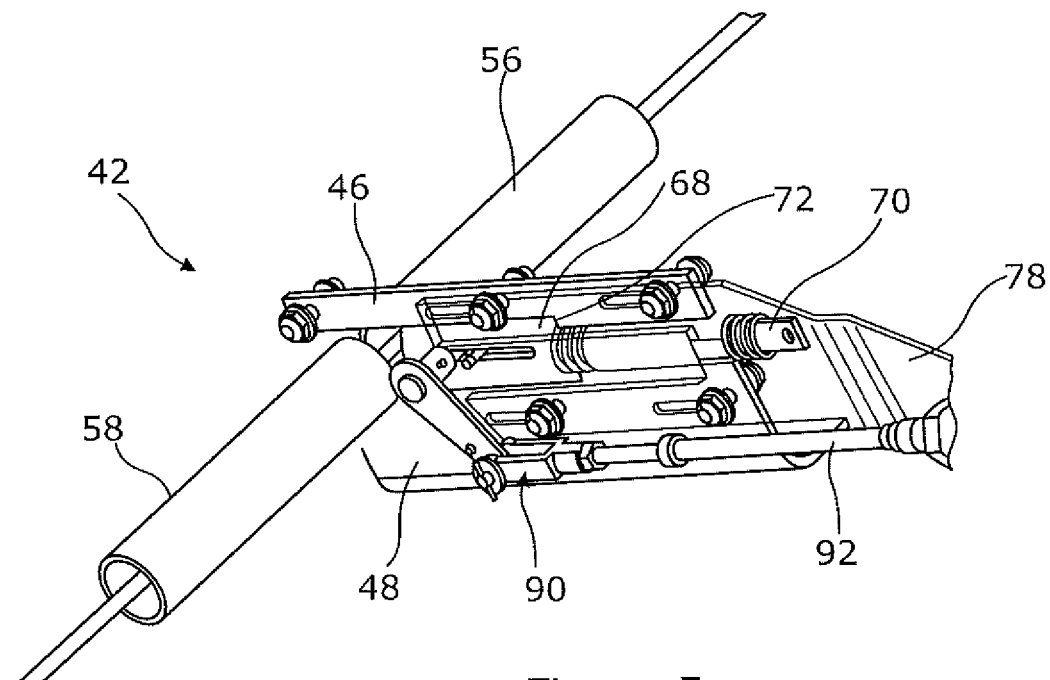
FIG. 5 shows a second perspective view of the twine tension relief assembly of FIG. 3 in which certain elements of the assembly have been removed for clarity.

As can be seen from FIGS. 4 and 5, the upper and lower central housing elements 46, 48 are secured between the first and second side housing elements 50,52. The upper and lower central housing elements 46, 48 and the first and second side housing elements 50,52 may be secured together in any convenient manner, for example by way of suitable fastenings.

The upper and lower central housing elements 46, 48 are generally planar and together provide a central channel extending between these elements. The central channel comprises a first relatively broader portion 62 through which in use the strand of twine may pass, and a second narrower portion 64 extending back from the first relatively broader portion 62. It can be seen that a first shoulder portion 66 connects the first relatively broader portion 62 and the second narrower portion 64.

A knife element 44 is housed within the central channel. The knife element 44 comprises a first broader portion 68 including a cutting edge and a second narrower portion 70 extending to the rear of the first broader portion 68. A shoulder portion 72 connects the first broader portion 68 and the second narrower portion 70. The first broader portion 68 is provided with a keyhole aperture (shown in more detail in FIG. 6) comprising a circular opening 74 at one end with an elongate channel 76 extending away from the circular opening 74 along a longitudinal axis of the knife element 44.

The first broader portion 68 of the knife element 44 is adapted to be located within the first broader portion 62 of the central channel of the central housing element. The second narrower portion 70 of the knife element extends back within the narrower portion 64 of the central channel.

A support bracket 78 is secured, in any suitable manner, to the one of the side housing elements, in the illustrated embodiment, the second side housing element 52. In the illustrated embodiment fasteners are used. A biasing element is provided to urge the knife element forwards out of the central channel. In the illustrated embodiment, the biasing element comprises a compression spring 80. The compression spring 80 is secured at a first end in any suitable manner at a fixed point of the twine relief assembly 42, for example to a rear of the central channel of the central housing element or to a suitable point on the support bracket 78. In use, the compression spring 80 extends around the narrower portion 70 of the knife element 44 and a second end of the compression spring 80 abuts the shoulder portion 72 of the knife element 44. It can be seen that a substantial portion of the compression spring 80 extends within the narrower portion 64 of the central channel.

A guide pin 82 connects the first and second side housing members and extends through the elongate channel 76 of the keyhole aperture of the knife element 44.

A locking device comprises a substantially cylindrical rotational body 84 extending through the first and second side housing elements 50,52. In the illustrated embodiment it can be seen that a portion of the rotational body 80 extends to the side of the second side housing element 52, where a first end of the rotational body 84 is fixedly attached to a first end of a lever arm 86. The lever arm 86 extends orthogonally away from the rotational body 84. The rotational body 84 is provided with two diametrically opposed cut away portions where the rotational body 84 extends though the knife element 44 to form a central linear portion 88 extending across the rotational body 84. In practice these cut away portions coincide with the region of the elongate channel 76 and so the knife element 44.

When the knife element 44 is in the first retained position, the central linear portion 88 is located within the circular opening 74 of the keyhole aperture, but is not aligned with the elongate channel 76 of that aperture. As such, the knife element 44 is held by the rotational body 88 against the force of the compression spring 80.

A second end of the lever arm 84 is housed within a yoke 90 of a joint. The free end of the joint is connected to a piston rod 92 controlled by an actuator 94.

Figure 8:
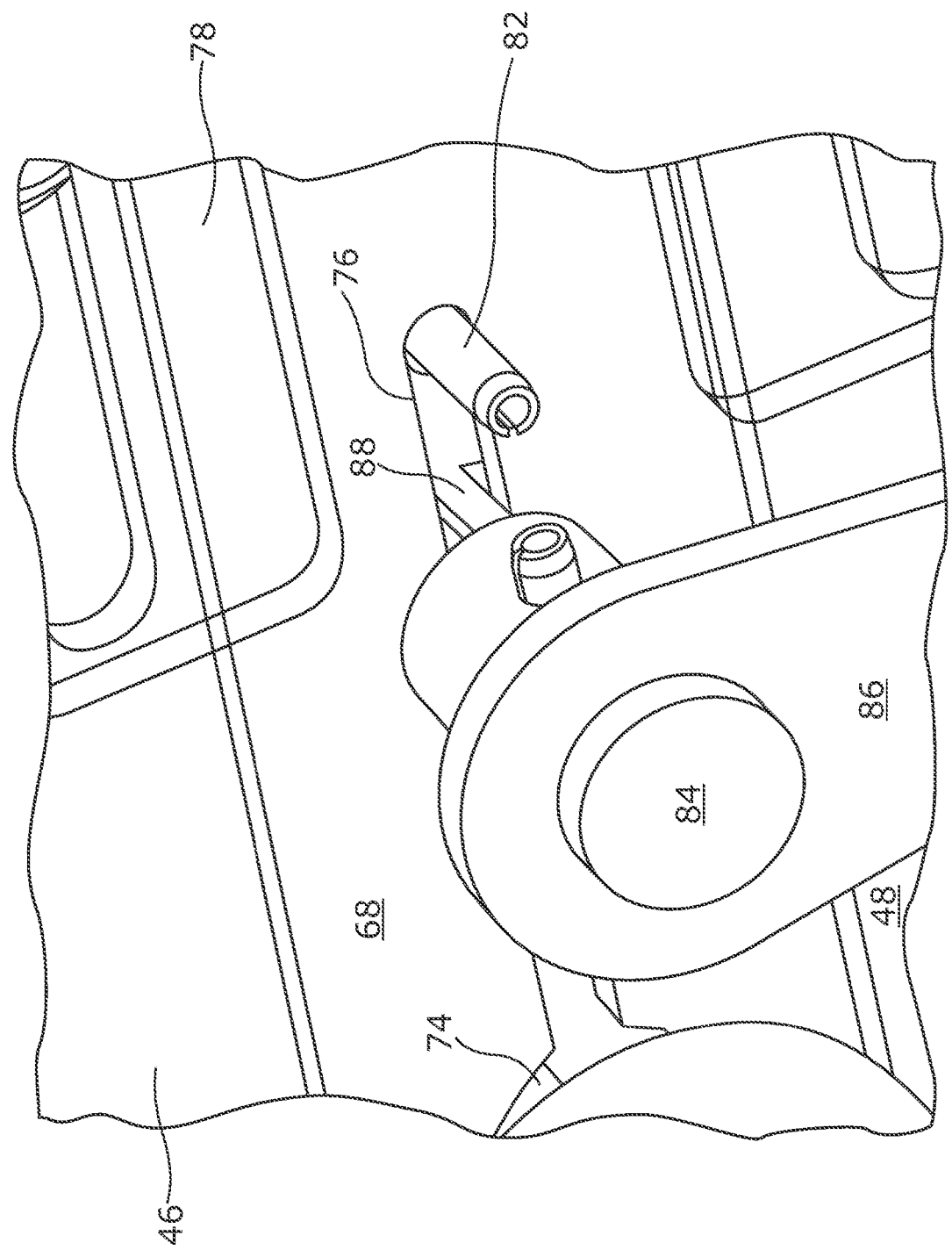
FIG. 8 shows a detail of FIG. 6.
Figure 9:
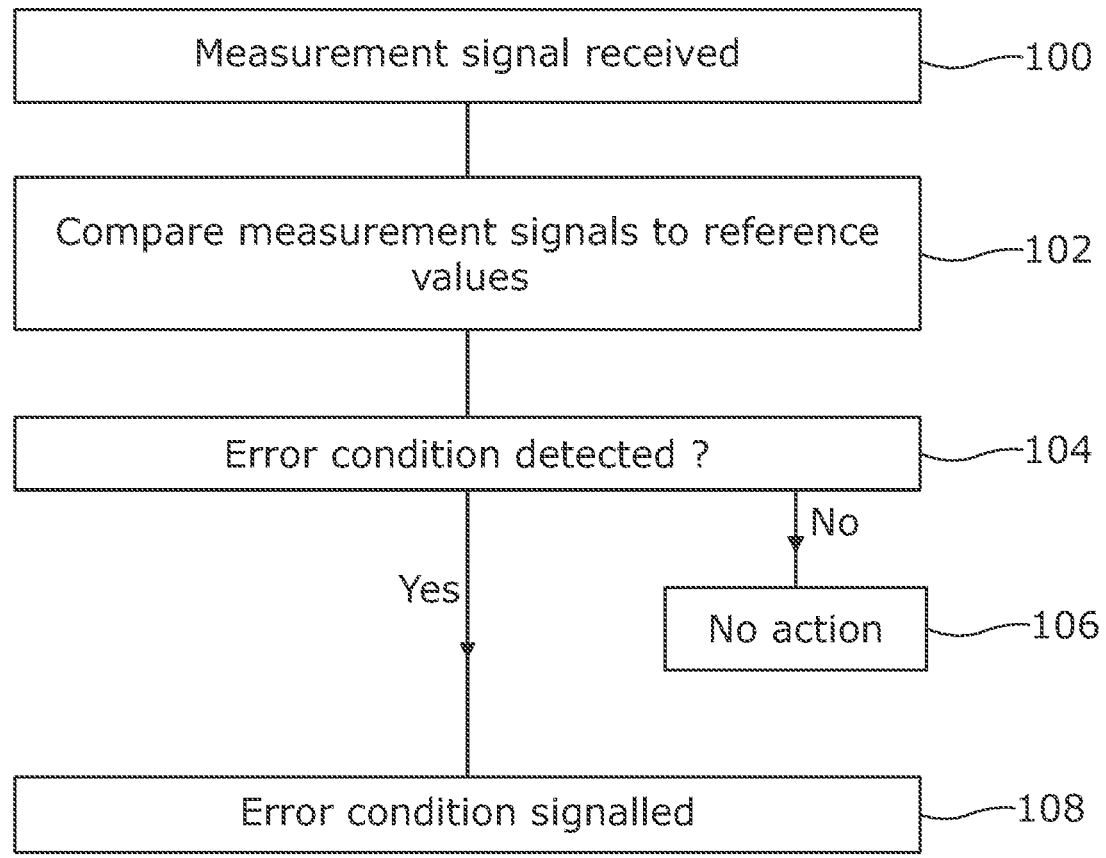
FIG. 9 shows a flow diagram illustrating an example control method for the present invention.

In operation, the electronic control unit 32 receives measurement signals from the twine tension detector 38, for example from a potentiometer (step 100, FIG. 8). The measurement signals are compared to the reference values in the memory (step 102). The electronic control unit 32 determines if an error condition is present (step 104). Such an error condition may correspond to a measurement signal in excess of a predetermined reference value or a series of measurement signals exceeding a predetermined reference value over a predetermined time interval. In the event of an error condition being determined, a signal is sent by the electronic control unit 32 to the relevant actuator 94 associated with the twine tension detector 38 issuing the measurement signal determined to have represented an error condition (step 108).

Figure 3:
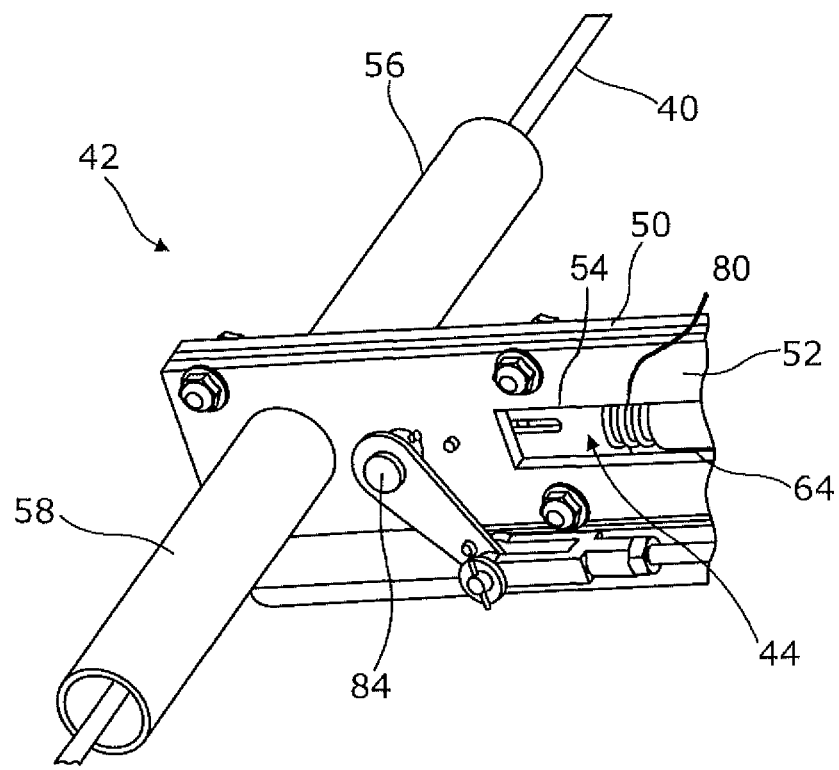
FIG. 3 shows a first perspective view of a twine tension relief assembly in accordance with the present invention in which the elements of the assembly are in a first configuration.
Figure 6:
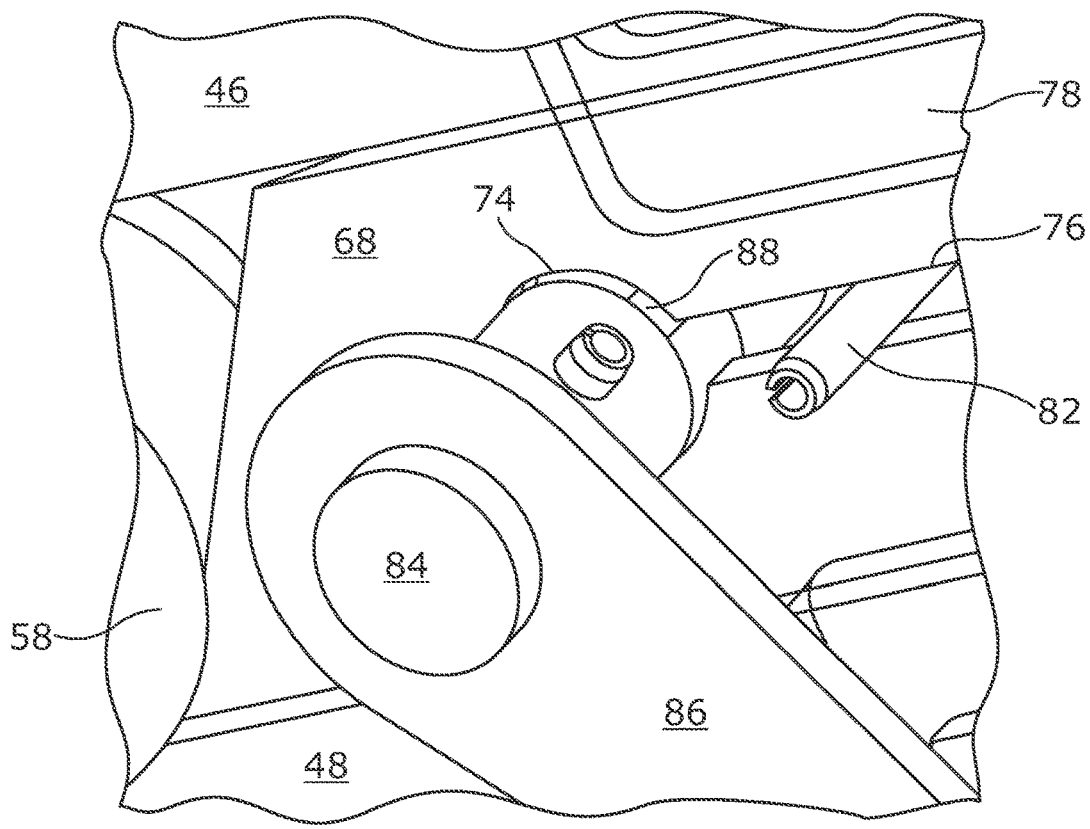
FIG. 6 shows a detail of FIGS. 4 and 5.
Figure 7:
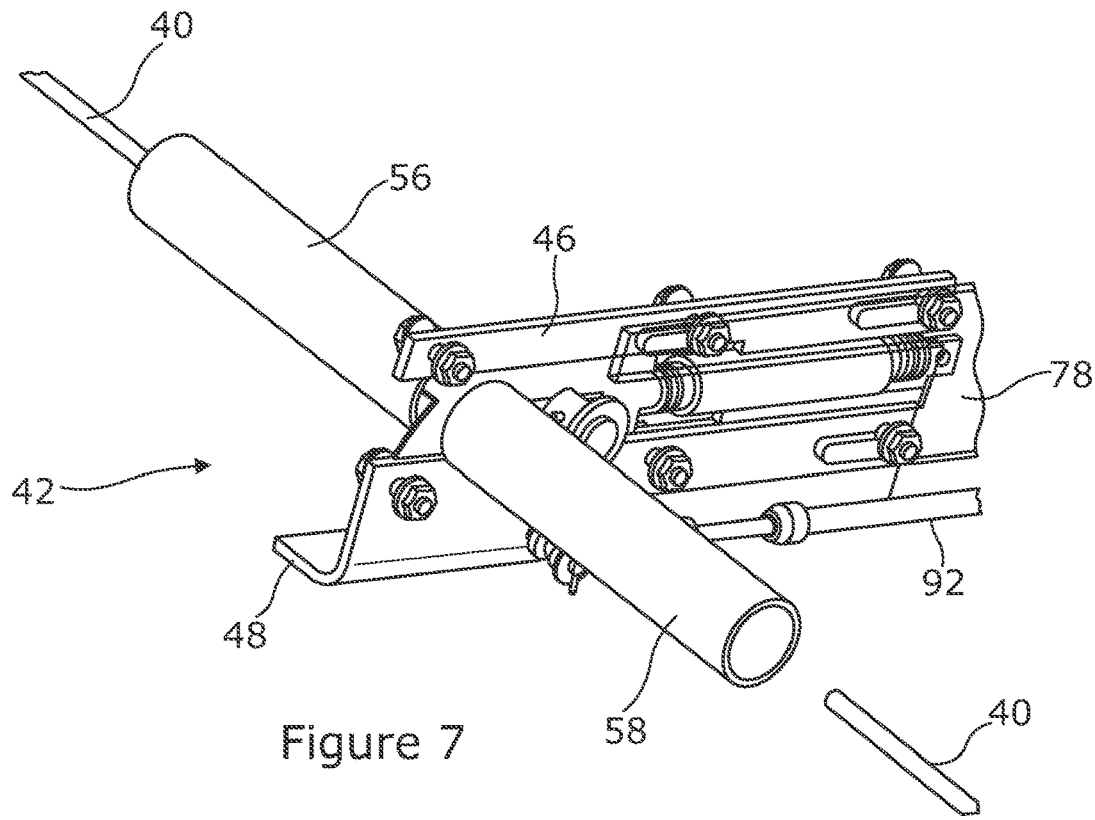
FIG. 7 shows the twine tension relief assembly of FIG. 4 in which the elements are in a second configuration.

The actuator 90 causes the piston rod 92 to advance—to the left as shown in FIGS. 3 to 5—thereby causing the lever arm 86 to rotate—clockwise as shown in the Figures. This, in turn causes the rotational body 84 to rotate such that the linear portion 88 becomes aligned with the elongate channel 76 of the keyhole aperture. Once aligned the rotational body 84 no longer acts against the compression spring 80 and the compression spring now drives the knife element 44 forwards and the blade of the knife element 44 across the strand 40 of twine so that the strand 40 of twine is severed (FIGS. 6 and 7). It will be understood that severing of the strand 40 of twine will automatically relieve the tension in the strand 40 of twine in the region of the knotter mechanism thereby preventing damage to the needles or other parts of the baler.

The forward movement of the knife element 44 is stopped by the trailing end of the elongate channel 76 abutting the guide pin 82. The compression spring 80 holds the knife element 44 against the guide pin 82 to maintain the biased cutting element in the second released position. It can be seen from FIG. 7 that in the second released position a rear end of the knife element 44 extends beyond the end of the narrower portion 64 of the channel. In the released position the blade of the knife element is retained between the first and second side elements 50,52 and does not project outwards beyond the housing of the twine tension relief assembly.

In the event of an error condition being determined, a signal is also sent by the electronic control unit 32 to the user terminal 30 to cause an operator of the baler 12 to be alerted to the existence of the error condition and the action taken to address the error condition (step 108). The user terminal 30 may indicate the error condition to the operator in any suitable manner, for example by way of a visual signal and/or an audible signal. The visual signal may, by way of example, take the form of an icon displayed on the user terminal. The audible signal may, by way of example, take the form of a tone or spoken message issuing from the user terminal. Since each twine relief assembly 42 is monitored, the signal from the control unit to the user terminal can indicate which twine relief assembly 42 has caused the signal to be generated, thereby enabling the operator quickly to identify the location of the problem and so take appropriate remedial action.

In the absence of an error condition being determined no signals are sent to the actuator or the user terminal (step 106).

In a preferred embodiment, the electronic control unit 32 also generates a signal to cause the operation of the baler 12 to cease. For example a signal may be sent to disengage a clutch (not shown) located between the PTO 18 and the reciprocating plunger 26 thereby preventing further bale formation. Again a suitable signal may be sent to the user terminal to alert the operator to this action being taken.

Appropriate remedial action may include untangling the strand of twine (or addressing another problem causing the tension in the strand of twine), and resetting the twine tension relief assembly by withdrawing the biased cutting element and rotating the rotational body back to the first configuration to hold the biased element in the first retained position before rethreading the strand of twine though the twine tension relief assembly to the associated knotter assembly to enable baling to continue.

From reading the present disclosure, other modifications will be apparent to persons skilled in the art. Such modifications may involve other features which are already known in the field of square balers and component parts therefore and which may be used instead of or in addition to features already described herein.

The invention claimed is:

1. A twine tension relief assembly for a baler comprising:
   a tension detection apparatus for detecting the tension in a line of twine;
   a biased cutting element comprising a displaceable knife element and a compression spring, the biased cutting element being displaceable between a first retained position and a second released position;
   a displaceable release mechanism; and
   an actuator adapted to release the biased cutting element from the first retained position and allow the biased cutting element to move to the second released position in response to a signal issued by the tension detection apparatus, wherein the displaceable knife element comprises a keyhole aperture comprising a circular opening and an elongate channel extending along a longitudinal axis of the displaceable knife element.

2. The twine tension relief assembly of claim 1, further comprising a housing having a channel in which the biased cutting element is located.

3. The twine tension relief assembly of claim 1, wherein the displaceable release mechanism comprises a rotational body rotatable about an axis between a first position or set of positions in which the biased cutting element is maintained in the first retained position, and a second position in which the biased cutting element is free to advance to the second released position.

4. The twine tension relief assembly of claim 3, wherein the rotational body extends through the keyhole aperture, and comprises a linear portion in the region of the keyhole aperture, the linear portion adopting a first configuration displaced from the elongate channel when the biased cutting element is in the first retained position, and a second configuration aligned with the elongate channel when the biased cutting element is in the second released position.

5. The twine tension relief assembly of claim 4, wherein the rotational body comprises a lever operated by the actuator to cause the rotational body to rotate the linear portion from the first configuration to the second configuration.

6. A combination comprising:
   an agricultural vehicle; and
   a baler towed by the agricultural vehicle,
   wherein the baler comprises:
      a plurality of knotter assemblies, wherein each of the knotter assemblies comprises a twine tension relief assembly comprising:

a tension detection apparatus for detecting the tension in a line of twine;

a biased cutting element displaceable between a first retained position and a second released position; and an actuator adapted to cause the biased cutting element to move from the first retained position to the second released position in response to a signal issued by the tension detection apparatus.

7. The combination of claim 6, further comprising:
a control unit; and
a memory in communication with the control unit,
wherein the control unit is configured to
receive the signals issued by each of the tension detection apparatus,
compare the signals against a predetermined set of values stored in the memory,
determine whether an error condition exists, and
when an error condition exists, generate a signal to operate the actuator associated with the tension detection apparatus generating the signal corresponding to the error condition.

8. The combination of claim 7, wherein the control unit comprises a processor located on the baler.

9. The combination of claim 7, wherein the control unit comprises a processor on the baler in communication with a processor on the agricultural vehicle.

10. The combination of claim 7, wherein the control unit comprises a processor located on the agricultural vehicle.

11. The combination of claim 7, wherein the agricultural vehicle comprises a user terminal in communication with the control unit.

12. The combination of claim 11, wherein the control unit is configured so that when the error condition is determined, the control unit generates a signal causing the user terminal to indicate which of the tension detection apparatus generated the signal corresponding to the determined error condition.

13. The combination of claim 12, wherein the control unit is configured to generate a signal to cause the baler to cease operating when an error condition is determined.

14. The combination of claim 6, further comprising a housing having a channel in which the biased cutting element is located.

15. The combination of claim 6, further comprising a displaceable release mechanism actuated by the actuator to release the biased cutting element from the first retained position and allow the biased cutting element to move to the second released position.

16. The combination of claim 15, wherein the biased cutting element comprises a displaceable knife element and a compression spring.

17. The combination of claim 16, wherein the knife element comprises a keyhole aperture comprising a circular opening and an elongate channel extending along a longitudinal axis of the knife element.

18. The combination of claim 17, wherein the displaceable release mechanism comprises a rotational body rotatable about an axis between a first position or set of positions in which the biased cutting element is maintained in the first retained position, and a second position in which the biased cutting element is free to advance to the second released position.

19. The combination of claim 18, wherein the rotational body extends through the keyhole aperture, and comprises a linear portion in the region of the keyhole aperture, the linear portion adopting a first configuration displaced from the elongate channel when the biased cutting element is in the first retained position, and a second configuration aligned with the elongate channel when the biased cutting element is in the second released position.

* * * * *